United States Patent
Wang et al.

(10) Patent No.: US 9,208,662 B2
(45) Date of Patent: Dec. 8, 2015

(54) METHODS AND DEVICES FOR SELECTIVELY CONTROLLING AND VARYING SURFACE TEXTURE AND/OR FORCE LEVELS ON A MOBILE DEVICE USING HAPTIC FEEDBACK

(75) Inventors: Huihui Wang, Charlottesville, VA (US); Roger M. Ruuspakka, San Diego, CA (US); Dimosthenis Kaleas, San Diego, CA (US); Robert S. Tartz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 649 days.

(21) Appl. No.: 13/423,059

(22) Filed: Mar. 16, 2012

(65) Prior Publication Data

US 2013/0241718 A1    Sep. 19, 2013

(51) Int. Cl.
   *H04B 3/36*    (2006.01)
   *G08B 6/00*    (2006.01)
   *G06F 3/01*    (2006.01)

(52) U.S. Cl.
   CPC . *G08B 6/00* (2013.01); *G06F 3/016* (2013.01)

(58) Field of Classification Search
   CPC .................................................. H04B 3/36
   USPC ............. 340/407.1, 407.2; 345/156, 173, 174
   See application file for complete search history.

(56) References Cited

U.S. PATENT DOCUMENTS

| 8,363,262 B2 * | 1/2013 | Silverbrook et al. ........ 358/1.18 |
| 8,717,151 B2 * | 5/2014 | Forutanpour et al. ...... 340/407.1 |
| 2008/0068225 A1 * | 3/2008 | Wahlstrom ...................... 341/22 |
| 2008/0303782 A1 | 12/2008 | Grant et al. |
| 2009/0085879 A1 * | 4/2009 | Dai et al. ....................... 345/173 |
| 2010/0141407 A1 * | 6/2010 | Heubel et al. .............. 340/407.1 |
| 2010/0283727 A1 | 11/2010 | Jiang et al. |

FOREIGN PATENT DOCUMENTS

| WO | 9814860 A1 | 4/1998 |
| WO | 2008124335 A1 | 10/2008 |

OTHER PUBLICATIONS

Fukuyama et al., "Tactile Display Using the Vibration of SMA Wires and the Evaluation of Perceived Sensations" IEEE, Catania, Italy, pp. 685-690 (2009).
Gupta et al., "SqueezeBlock:Using Virtual Springs in Mobile Devices for Eyes-Free Interaction", UIST'10, New York, New York, USA, pp. 1-4 (2010).
Pasquero et al.,"Haptically Enabled Handheld Information Display with Distributed Tactile Transducer", IEEE Transactions on Multimedia, vol. 9, No. 4, pp. 1-9 (2007).
International Search Report and Written Opinion—PCT/US2013/032441—ISA/EPO—Jul. 15, 2013.

* cited by examiner

*Primary Examiner* — Daryl Pope
(74) *Attorney, Agent, or Firm* — Charles E. Eggers

(57) ABSTRACT

Mobile devices having haptic interfaces located on an edge or back of mobile phones for selectively controlling and varying surface texture and/or force levels are provided. The haptic interfaces may allow for haptic interaction with the user of the mobile device when audio or visual feedback is not practical. The haptic interface may be an electro-mechanical system that may include a matrix or array of individually addressable actuators that can convey haptic information through the deformation of a flexible surface or membrane covering the array of individually addressable actuators. The array of "individually addressable" actuators may provide each actuator the ability to be separately addressable or addressable as a group (i.e. two or more) actuators.

45 Claims, 9 Drawing Sheets

METHODS AND DEVICES FOR SELECTIVELY CONTROLLING AND VARYING SURFACE TEXTURE AND/OR FORCE LEVELS ON A MOBILE DEVICE USING HAPTIC FEEDBACK

BACKGROUND

1. Field

Aspects of the present disclosure relate generally to methods and devices for selectively controlling and varying surface texture and/or force levels on a mobile device using haptic feedback.

2. Background

Current mobile devices generally rely on audio or visual machine-to-human interfaces: for example, the ringing of a mobile phone or the blinking of a light emitting diode (LED) to indicate an incoming message. Vibration of mobile devices has also been used to notify users of incoming messages. However, each of these types of notifications has some shortcomings. For example, visual information, such as flashing lights or interactive displays, is not only inconvenient but dangerous while the user is driving or is otherwise occupied. Additionally, mobile devices are frequently stored in purses, bags and the pockets of users and if the user is occupied, taking the mobile device out from a bag or pocket, checking the screen for the message and pressing a button in response to the message is not a practical solution.

Audio feedback may alleviate these shortcomings in some scenarios, but still may be inconvenient or inappropriate in some social environments, e.g., during meetings or in noisy surroundings. Vibration relieves some of these issues, but the brief vibration may not be felt by the user and long-term vibration is infeasible due to the limited battery life of the mobile device.

In view of the above, additional methods and devices for human-to-machine communication are needed.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In accordance with various aspects of the disclosure, mobile devices having haptic interfaces, which may be located for example on an edge or back of mobile phones, for selectively controlling and varying surface texture and/or force levels are provided. The haptic interfaces may allow for haptic interaction with the user of the mobile device when audio or visual feedback is not practical. The haptic interface may be an electro-mechanical system that may include a matrix or array of individually addressable actuators that can convey haptic information through the deformation of a flexible surface or membrane covering the array of individually addressable actuators. The array of "individually addressable" actuators may provide each actuator the ability to be separately addressable or addressable as a group (i.e., two or more) actuators.

In one aspect, the disclosure provides a haptic interface for varying surface texture that includes: a top surface including a flexible membrane; a bottom surface, parallel to and opposite the top surface; and an array of individually addressable actuators disposed between the top surface and the bottom surface, wherein each individually addressable actuator in the array of individually addressable actuators is configured to cause a localized deformation of the top surface into a configurable shape based on an incoming signal. The haptic interface may further include a plurality of input sensors located between the top surface and the bottom surface for receiving input information in accordance with a touch of the flexible membrane. Moreover, a touching or deforming of the flexible membrane may cause at least one of the plurality of input sensors to compress and generate a feedback signal. Here, the feedback signal and the input signal may be combined to actuate one or more of the individually addressable actuators to generate a physical pattern on the top surface. The incoming signal can be an audible signal, a visual signal or a textual signal. Each of the individually addressable actuators in the array of individually addressable actuators may include a two-way shape memory alloy (SMA) material that is adapted to deform with an electric current corresponding to the incoming signal, and to return to a pre-deformed shape in accordance with a turning off of the electric current. In some examples, the material may be in the form of a wire, a tube, a sheet or a spring. If the material is in the form of a spring, an individually addressable spring may be pre-configured in a first un-actuated (e.g., compressive) position, such that the application of a voltage to the individually addressable spring may cause the individually addressable spring to expand to a first actuated position causing a localized positive deformation in the flexible membrane. Removal of the voltage to the individually addressable spring may cause the individually addressable spring to return to the first un-actuated position, thereby removing the localized positive deformation in the flexible membrane. The individually addressable spring may alternatively be pre-configured in a second un-actuated (e.g., tensile) position, such that the application of a voltage to the individually addressable spring may cause the individually addressable spring to compress to a second actuated position causing a localized negative deformation in the flexible membrane. Removal of the voltage to the individually addressable spring may cause the individually addressable spring to return to the second un-actuated position. One or more individually addressable actuators in the array of individually addressable actuators may be combined in a group causing the one or more individually addressable actuators in the group to actuate in unison. Furthermore, one or more individually addressable actuators in the array of individually addressable actuators may surround a thermoelectric cylinder for cooling the one or more individually addressable actuators.

Another aspect of the disclosure provides an interactive mobile device having a haptic interface, a memory device and at least one processor coupled to the haptic interface and the memory device. The haptic interface may include: a top surface including a flexible membrane; a bottom surface parallel to and opposite the top surface; and an array of individually addressable actuators disposed between the top surface and the bottom surface, wherein each individually addressable actuator in the array of individually addressable actuators is configured to cause a localized deformation of the top surface into a configurable shape based on an incoming signal; and a plurality of input sensors disposed between the top surface and the bottom surface for providing user feedback. The at least one processor may be configured to receive an incoming signal, which may be in the form of an audible signal, a visual signal or textual signal; and actuate one or more individually addressable actuators in the array of individually addressable actuators to cause the localized deformation of the flexible membrane to generate a physical pattern. The at least one processor may be further configured to receive at least one feedback signal from the plurality of input sensors by touching or deforming the flexible membrane compressing one or more of the plurality of input sensors; combine the at least one feedback signal with the incoming signal; and adjust the one or more individually addressable actuators in the array of individually addressable actuators based on the at least one feedback signal, generating a different physical pattern. Moreover, the at least one processor may be further configured to interpret the at least one feedback signal; convert the at least one feedback signal to an outgoing signal; and transmit the outgoing signal in the form of an audible, visual or textual signal. Each of the individually addressable actuators in the array of individually addressable actuators may include a two-way shape memory alloy (SMA) material that is adapted to deform in accordance with an electric current corresponding to the incoming signal, and to return to a pre-deformed shape in accordance with a turning off of the electric current. In some examples, the material may be in the form of a wire, a tube, a sheet or a spring. If the material is in the form of a spring, an individually addressable spring may be pre-configured in a first un-actuated (e.g., compressive) position, such that the application of a voltage to the individually addressable spring may cause the individually addressable spring to expand causing a localized positive deformation in the flexible membrane. Removal of the voltage to the individually addressable spring may cause the individually addressable spring to return to the first un-actuated position. Alternatively, the individually addressable spring may be pre-configured in a second un-actuated (e.g., tensile) position, such that the application of a voltage to the individually addressable spring may cause the individually addressable spring to compress to an actuated position causing a localized negative deformation in the flexible membrane. Removal of the voltage to the individually addressable spring may cause the individually addressable spring to return to the second un-actuated position.

Another aspect of the disclosure provides a method operational on an interactive mobile device that includes: receiving an incoming signal; actuating one or more individually addressable actuators in an array of individually addressable actuators to cause a localized deformation of a flexible membrane, generating a first physical pattern; and receiving one or more feedback signals from one or more input sensors by touching or deforming the flexible membrane. The method may further include combining the one or more feedback signals with the incoming signal, the incoming signal being an audible, visual or textual signal; adjusting the one or more individually addressable actuators in the array of individually addressable actuators based on the one or more feedback signals to generate a second physical pattern, where the second physical pattern may be different than the first physical pattern; interpreting the one or more feedback signals; converting the one or more feedback signals to an outgoing signal; and transmitting the outgoing signal in the form of an audible, visual or textual signal. Each of the individually addressable actuators in the array of individually addressable actuators may include a two-way shape memory alloy (SMA) material that is adapted to deform in accordance with an electric current corresponding to the incoming signal, and to return to a pre-deformed shape in accordance with a turning off of the electric current. In some examples, the material may be in the form of a wire, a tube, a sheet or a spring. If the material is in the form of a spring, an individually addressable spring may be pre-configured in a first un-actuated (e.g., compressive) position, such that the application of a voltage to the individually addressable spring may cause the individually addressable spring to expand causing a localized positive deformation in the flexible membrane. Removal of the voltage to the individually addressable spring may cause the individually addressable spring to return to the first un-actuated position. Alternatively, the individually addressable spring may be pre-configured in a second un-actuated (e.g., tensile) position, such that the application of a voltage to the individually addressable spring may cause the individually addressable spring to compress to an actuated position causing a localized negative deformation in the flexible membrane. Removal of the voltage to the individually addressable spring may cause the individually addressable spring to return to the second un-actuated position.

Another aspect of the disclosure provides an interactive mobile device that includes: means for receiving an incoming signal; means for actuating one or more individually addressable actuators in an array of individually addressable actuators to cause a localized deformation of a flexible membrane generating a first physical pattern; and means for receiving one or more feedback signals from one or more input sensors by touching or deforming the flexible membrane. The interactive mobile device may further include means for combining the one or more feedback signals with the incoming signal; means for adjusting the one or more individually addressable actuators in the array of individually addressable actuators based on the one or more feedback signals; generating a second physical pattern, the second physical pattern different than the first physical pattern; means for interpreting the one or more feedback signals; means for converting the one or more feedback signals to an outgoing signal; and means for transmitting the outgoing signal in the form of an audible, visual or textual signal. Each of the individually addressable actuators in the array of individually addressable actuators may include a two-way shape memory alloy (SMA) material adapted to deform in accordance with an electric current corresponding to the incoming signal, and to return to a pre-deformed shape in accordance with a turning off of the electric current. In some examples, the material may be in the form of a wire, a tube, a sheet or a spring. If the material is in the form of a spring, an individually addressable spring may be pre-configured in a first un-actuated (e.g., compressive) position, such that the application of a voltage to the individually addressable spring may cause the individually addressable spring to expand causing a localized positive deformation in the flexible membrane. Removal of the voltage to the individually addressable spring may cause the individually addressable spring to return to the first un-actuated position. Alternatively, the individually addressable spring may be pre-configured in a second un-actuated (e.g., tensile) position, such that the application of a voltage to the individually addressable spring may cause the individually addressable spring to compress to a second un-actuated position causing a localized negative deformation in the flexible membrane. Removal of the voltage to the individually addressable spring may cause the individually addressable spring to return to the second un-actuated position.

These and other aspects of the invention will become more fully understood upon a review of the detailed description, which follows.

DETAILED DESCRIPTION

Figure 1:
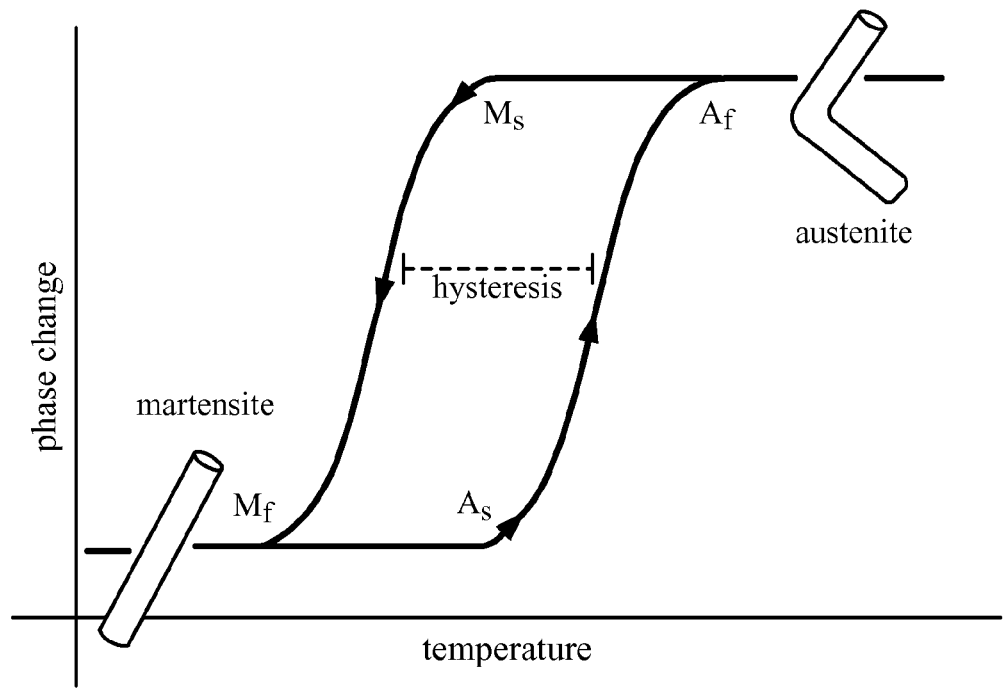
FIG. 1 illustrates a hysteresis loop for a shape memory alloy (SMA) according to one example.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The word "exemplary" is used herein to mean "serving as an example, instance, or illustration." Any implementation or embodiment described herein as "exemplary" is not necessarily to be construed as preferred or advantageous over other embodiments. Likewise, the term "embodiments" does not require that all embodiments include the discussed feature, advantage or mode of operation.

The term "mobile device" may refer to a wireless device, a mobile phone, a mobile communication device, a user communication device, personal digital assistant, mobile palm-held computer, a laptop computer, and/or other types of mobile devices typically carried by individuals and/or having some form of communication capabilities (e.g., wireless, infrared, short-range radio, etc.). Moreover, while many of the examples described in the present disclosure specifically refer to a haptic interface being provided on a mobile device, this is only intended to be one example, and the methods and interfaces described in the present disclosure may be implemented on any kind of apparatus or device, being a fixed or mobile device.

Overview

Mobile devices having haptic interfaces located on an edge or back of mobile phones for selectively controlling and varying surface texture and/or force levels are provided. The haptic interfaces may allow for haptic interaction with the user of the mobile device when audio or visual feedback is not practical. The haptic interface may be an electro-mechanical system that may include a matrix or array of individually addressable actuators that can convey haptic information through the deformation of a flexible surface or membrane covering the array of individually addressable actuators. The array of "individually addressable" actuators may provide each actuator the ability to be separately addressable or addressable as a group (i.e. two or more actuators).

According to one feature, the actuators may include two-way shape memory alloy (SMA) material having any suitable shape, such as a spring, which may be adapted to be capable of operating at a lower voltage (e.g., less than the 3.7 V typically used in a mobile device battery) and at a temperature that is compatible with mobile devices. The actuators can form to different shapes due to the thermal effect as current travels through the actuators. For example, the original shape of the haptic interface, via the actuators, can change to another shape related to the specific sender or the type of information that is being received. Further, this interface can simultaneously realize multiple methods for conveying haptic information such as changing the dimensions of the interface; applying a force to the interface; changing the texture of the interface; or even changing the temperature. Unlike one-way shape memory alloy, once the current has been turned off or removed from the two-way memory alloy (e.g. springs), the haptic interface may be able to go back to the original shape by itself.

Feedback interfaces with these properties may be utilized to assist users to recognize and differentiate various information being provided by the mobile device. For example, the deformation and varying of the surface texture may be used to create different types of feelings and textures that a user can differentiate with the palm of a hand. To vary the surface texture to create different haptic surfaces, each of the actuators in the array may be separately addressable such that each actuator may receive a different voltage causing each actuator to actuate differently: some of the actuators may expand causing a localized positive deformation in the membrane while other actuators may contract causing a localized negative deformation in the membrane and still others may not be actuated. The number of different patterns that are possible may only be limited by the number of actuators used.

According to another feature, the haptic interface may support input as well as haptic output; that is, sensors amongst the actuators can enable input such as touch, pressing a "button," rubbing, or any suitable deformation of the flexible membrane, enabling two-way haptic communication with the interface.

Shape Memory Alloy

Shape memory alloy (SMA) is a thermomechanical alloy that has at least two different temperature-dependent phases or polarity. That is, shape memory alloys may have metallurgic properties that include the shape memory effect and temperature field dependent atomic lattice transformations, which may be interpreted as phase changes. Temperature dependent phases of shape memory alloys may include martensite phases and an austenite phase. The austenite phase may typically be strong, hard, and rotationally symmetric, whereas the martensite phases may be soft, deformable, and less symmetric than the austenite phase. A shape memory alloy may exhibit either or both of the austenite and martensite phases at once.

FIG. 1 illustrates a hysteresis loop for a shape memory alloy (SMA) according to one example. The hysteresis loop may be shown as a graph illustrating an example of a phase-temperature relation of martensite and austenite phases of a shape memory alloy. As shown, when the less symmetric phase martensite is heated, it may begin to structurally change into the austenite phase at the austenite start temperature $A_s$. The SMA may be heated, for example, through either thermal heating, resistive heating, or light radiation heating to its austenite start temperature, $A_s$, and the phase change to austenite may be completed at the austenite finish temperature $A_f$. That is, the SMA may begin to change its shape until the austenite final temperature, $A_f$ (the higher temperature) regains its memorized shape and then it may begin to change to the martensite phase at the martensite start temperature $M_s$. It can complete its phase change to martensite at the martensite finish temperature $M_f$. In one example, the temperatures $A_s$, $A_f$, $M_s$, $M_f$ may not be the same. The hysteresis may be demonstrated by the area between these transformation curves and may be a measure of the energy absorbed or released by the material during the overall transformation.

As shown, at the martensite finish temperature $M_f$ (the lower temperature), a SMA may be more malleable and easily deformed. At the austenite phase, the SMA may become rigid and remember the memorized shape. When the temperature cools down to the martensite start temperature, $M_s$, the austenite phase may begin to change back to the martensite phase. The temperature at which a SMA can remember its austenite phase shape may be adjusted by changing the composition of the alloy slightly and the thermomechanical process. The start and final transformation phase may be controlled by the specific application and alloy composition. Shape memory alloy may be under a large stress by realigning the crystal structure arrangement at the martensite phase. The SMA may retain its memorized shape when the stress is removed.

The most common shape memory alloy is a nickel and titanium based alloy. The alloy can be binary, tenary, or a higher order of the shape memory effect such as changes in shape, orientation, yield strength, flexural modulus, damping capacity, or superelasticity.

According to one feature, a two-way SMA may be utilized. A two-way SMA is generally the same as that of a one-way SMA except that the shape memory effect has a dual order. Different from one-way SMA, which cannot return to its original shape by itself when the temperature reduces back to the martensite phase temperature, the two-way SMA can realize the shape change automatically with the temperature change by itself. The actuator may be heated to the austenite phase (the memorized shape) under the physics that the current will produce the heat when passing through a resistor. Then the shape may automatically go back to the original shape as the actuator cools when the current is off. According to one example, the SMA actuator may take the form of a spring, and may have a 0.5 millimeter (mm) diameter and a maximum strain of 4%. The martensite temperature may be 25° C. and the austenite temperature may 55° C. By way of example and without limitation, the SMA be in the form or wires, springs, tubes, thin film, or sheet actuated via body temperature (active working temperature), or linear actuators. The SMA may also be formed of a composite under soft polymers for providing a flexible and elastic interface.

Figure 2:
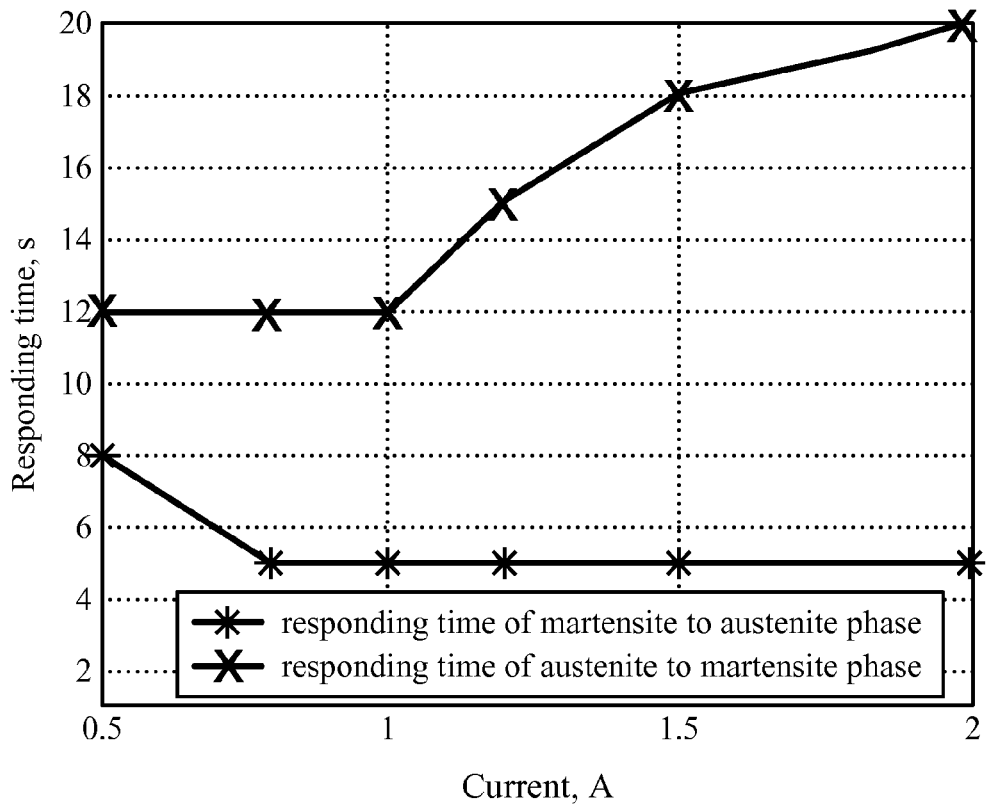
FIG. 2 is a graph illustrating one example of response time vs. current for the martensite to austenite phases and austenite to martensite phases for an array of three SMA springs.

FIG. 2 is a graph illustrating one example of response time vs. current for the martensite to austenite phases and austenite to martensite phases for an array of three SMA springs. Table 1, below, illustrates the parameters of each of the springs in this example. As shown in the graph, there may be a trade-off between the response time and current. Optimized current vs. response time may be plotted, which shows that the response time from the martensite phase to the austenite phase (i.e. the duration when the temperature increases from room temperature to the active work temperature) may be approximately the same for different current. However, the response time of the austenite phase to the martensite phase may change depending on the current. As shown, the optimized current may be approximately 1 A and 12 seconds of response time of the austenite to martensite phase change, while 5 seconds of response time of the martensite to the austenite phase change.

TABLE 1

|  | Spring 1 ($L_1$) | Spring 2 ($L_2$) | Spring 3 ($L_3$) |
| --- | --- | --- | --- |
| Length | 1.2 cm | 0.9 cm | 1.1 cm |
| Wire Diameter |  | 0.5 mm |  |
| Outer Circle Diameter |  | 7 mm |  |

Structure Having an Array of Two-Way Shape Memory Alloy Actuators

Figure 3:
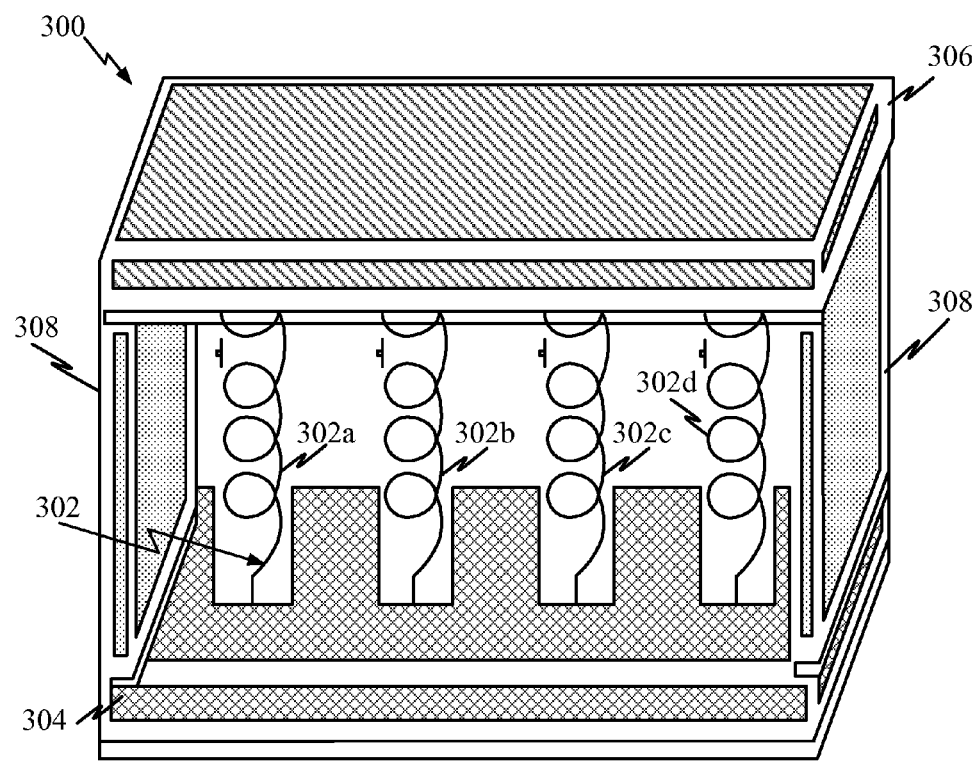
FIG. 3 illustrates a structure having an array of two-way shape memory alloys according to one example.

FIG. 3 illustrates a structure having an array of individually addressable actuators according to one example. The structure 300 may include an array 302 of individually addressable actuators 302a-302d located between a bottom surface 304 and a top surface 306. The bottom surface 304 may be a fixed substrate and the top surface 306 may be a flexible surface or membrane made of a thin polymer, for example Polydimethylsiloxane (PDMS), integrally connected to and separated by a pair of support walls 308. PMDS is a silicone polymer having the look of a soft and transparent rubber.

The array of individually addressable actuators may convey haptic information through the deformation of the flexible surface or membrane 306 covering the array of individually addressable actuators. The array of "individually addressable" actuators may provide each actuator the ability to be separately addressable or to be addressable as a group (i.e. two or more) of actuators.

According to one example, each of the individually addressable actuators may include a two-way shape memory alloy material adapted to deform in accordance with an electric current corresponding to an input signal and return to a pre-deformed shape in accordance with turning off the electric current. The two-way shape memory alloy material may be, for example, springs that may be either stretched (or expanded) or compressed to the memorized (or trained or pre-configured) shapes resulting in the deformation of the thin polymer layer of the top surface 306. Upon actuation of an actuator in the array, the actuator may expand causing a localized positive deformation in the membrane or the actuator may contract causing a localized negative deformation in the membrane. That is, the actuator may only deform a portion of the membrane in which it is in contact with.

According to one example, each of the individually addressable actuators may be in the form of a spring and each individually addressable spring may be pre-configured in an un-actuated position. Applying a voltage to individually addressable springs pre-configured in an un-actuated position may cause the individually addressable springs to either expand creating a localized a positive deformation in the flexible membrane or contract creating a localized negative deformation in the flexible membrane. That is, the springs may be pre-configured in an un-actuated position and application of a voltage may cause the springs to either expand or contract. Removal of the voltage from the individually addressable spring may cause the individually addressable spring to return to its pre-configured un-actuated position.

Haptic Interface Input

Figure 4A:
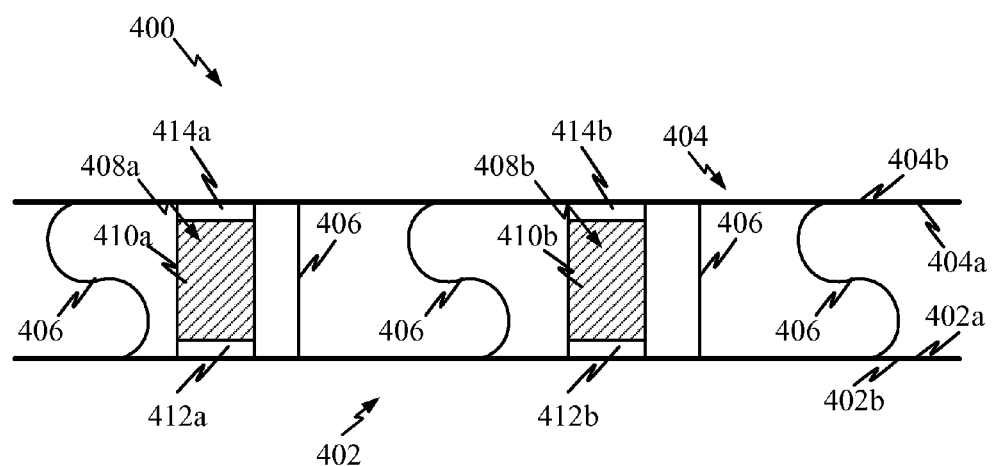
FIG. 4A illustrates a schematic cross-sectional view of a structure having an array of individually addressable actuators and input sensors, according to one example.
Figure 4B:
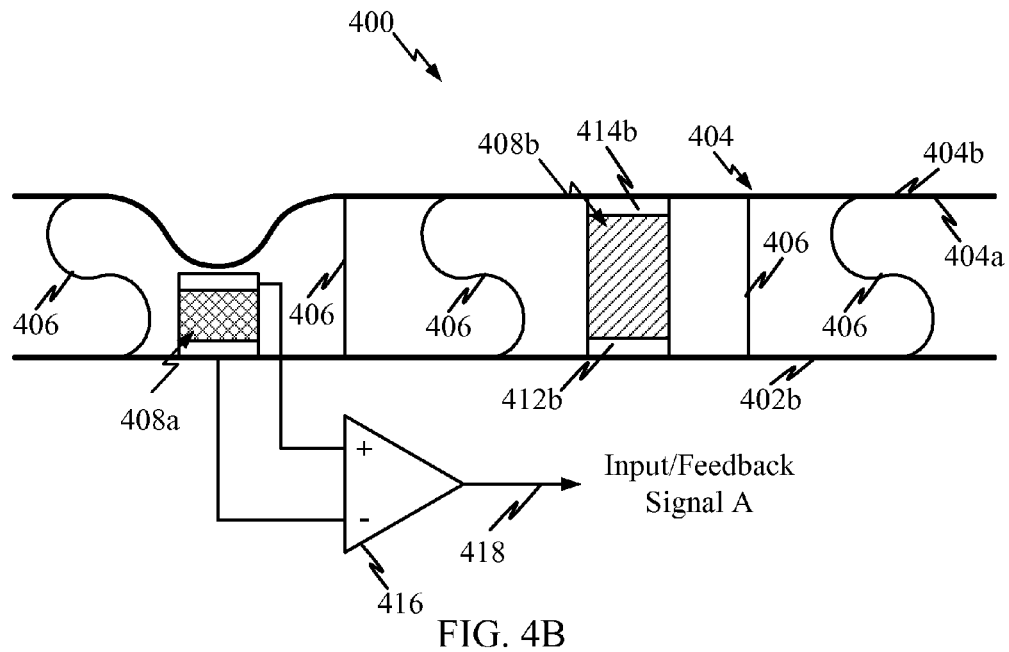
FIG. 4B illustrates the schematic cross-sectional view of the structure of FIG. 4A with a first input sensor in a depressed position.
Figure 4C:
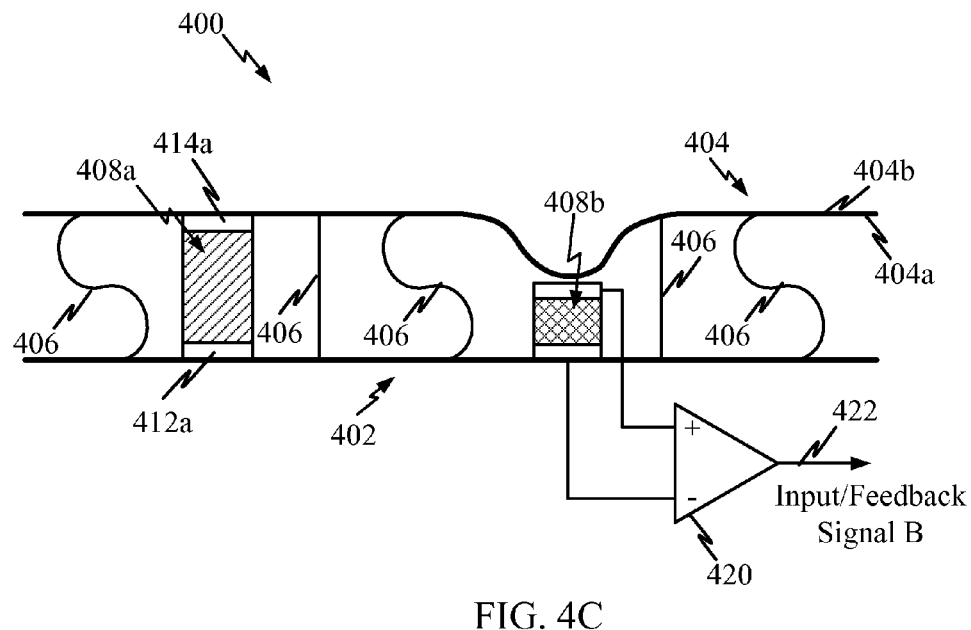
FIG. 4C illustrates schematic the cross-section view of the structure of FIG. 4A with a second input sensor in a depressed position.

FIGS. 4A-4C illustrate a haptic interface input for enabling the input for two-way haptic communication with a structure, such as a mobile device. Turning to FIG. 4A, a cross-sectional view of a structure having an array of individually addressable actuators and input sensors is illustrated, according to one example. As shown, the structure 400 may include a bottom surface 402 and a top surface 404 separated by one or more individually addressable actuators 406 and one or more input sensors 408. The bottom surface 402 may include a rigid material having a bottom inner portion 402a and a bottom outer portion 402b, and the top surface 404 may include a flexible membrane having a top inner portion 404a and a top outer portion 404b. Each of the actuators may be integrally connected to the bottom inner portion 402a and the upper inner portion 404a such that actuation of an actuator in the array may cause the actuator to expand causing a localized positive deformation in the top surface 404 or contract causing a localized negative deformation in the top surface 404. That is, the actuator may only deform the portion of the top surface 404 with which it is in contact.

By way of example and without limitation, each of the individually addressable actuators may be a two-way shape memory alloy (SMA) material adapted to deform in accordance with an electric current (or voltage) corresponding to an input signal, and to return to a pre-deformed shape in accordance with turning off the electric current (or voltage), as described above. In some examples, the two-way shape memory alloy material may be in the form of springs that may be pre-trained, pre-configured or shaped in an un-actuated position in any manner sufficient to achieve a desired action. In a further example, applying a voltage to an individually addressable actuator that is pre-configured in an un-actuated position may cause the individually addressable actuator either to expand, creating a localized a positive deformation in the flexible membrane in the top surface 404, or to contract, creating a localized negative deformation in the flexible membrane in the top surface 404. That is, the springs may be pre-configured in an un-actuated position and application of a voltage may cause the spring to either expand or contract. Removal of the voltage from the individually addressable spring may cause the individually addressable spring to return to its pre-configured un-actuated position.

Each of the input sensors 408a, 408b may include a material 410a, 410b located between a lower sensor 412a, 412b on the bottom inner portion 402a of the bottom surface 402 and an upper sensor 414a, 414b on the top inner portion 404a of the top surface 404. The material 410a, 410b may be a capacitive, dielectric or resistive material such that depressing, compressing or squeezing the input sensors 408a, 408b results in the generation of an input signal.

As shown in FIG. 4B, a first amplifier 416 may be coupled to the first input sensor 408a. Compressing the first input sensor 408a may generate a first feedback signal 418, which may be amplified by the first amplifier 416. The first feedback signal 418 may then be sent to a processor as an incoming signal and/or sensor feedback. As discussed in further detail below, the processor may provide instructions to the array of individually addressable actuators based upon the first feedback signal 418.

As shown in FIG. 4C, a second amplifier 420 may be coupled to the second input sensor 408b. Compressing the first input sensor 408b may generate a second signal 422, which may be amplified by the second amplifier 420. The second feedback signal 422 may then be sent to a processor as an incoming signal and/or sensor feedback. As discussed in further detail below, the processor may provide instructions to the array of individually addressable actuators based upon the second feedback signal 422.

Although two input sensors 408a, 408b are shown, this is by way of example and not limitation. The structure may have no input sensors, one input sensor or more than two input sensors. The input sensors may be used to enable input by the user providing two-way haptic communication (i.e. interactive) with the structure. Furthermore, utilizing a plurality of input sensors may assist users by allowing the users to use their hands to respond to different information transmitted by the structure or mobile device by the selectively compressing one or more of the input sensors.

Haptic Interface Output

Figure 5A:
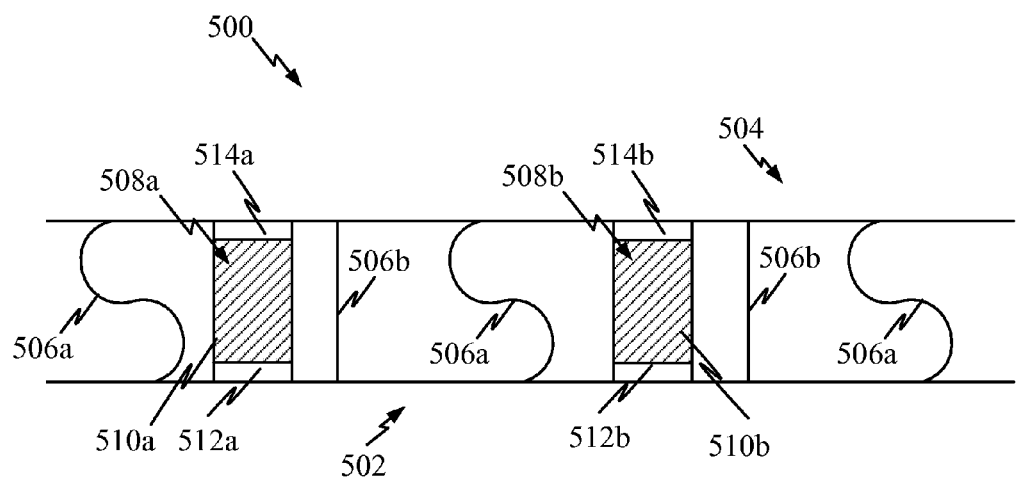
FIG. 5A illustrates a schematic cross-sectional view of a structure having an array of individually addressable actuators and input sensors, according to one example.
Figure 5B:
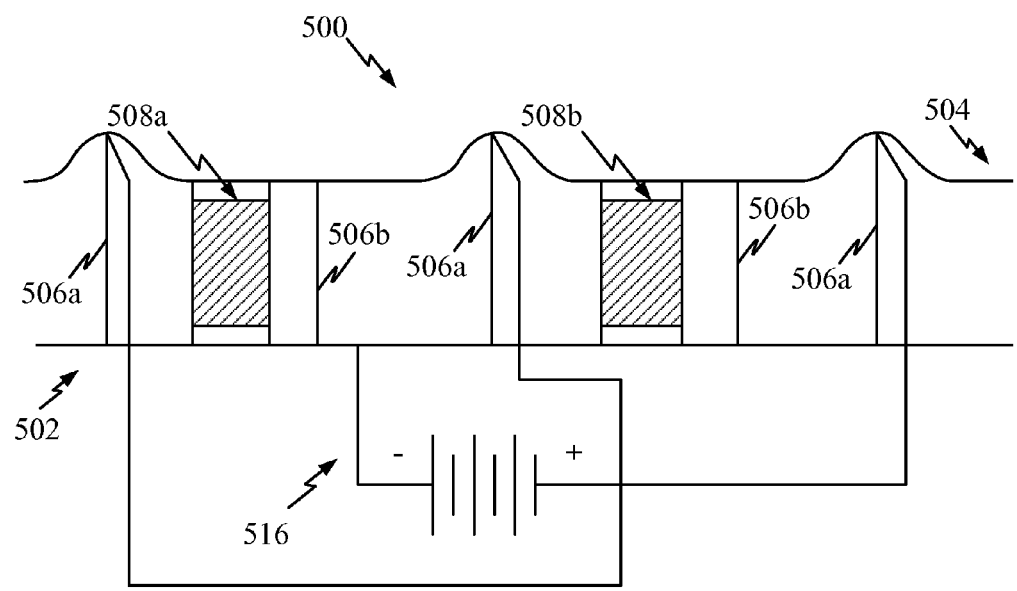
FIG. 5B illustrates the schematic cross-sectional view of the structure of FIG. 5A having individually addressable actuators in expanded and neutral positions.
Figure 5C:
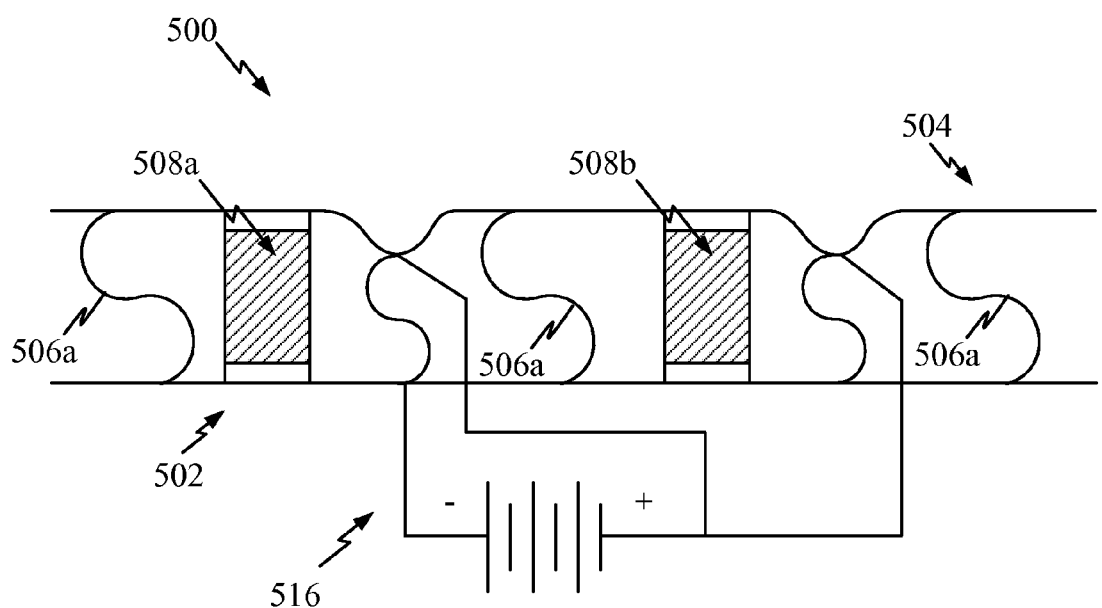
FIG. 5C illustrates the schematic cross-sectional view of the structure of FIG. 5A having individually addressable actuators in contracted and neutral positions.

FIGS. 5A-5C illustrate a haptic interface output for enabling the output for two-way haptic communication with a structure, such as a mobile device. Turning to FIG. 5A, a cross-sectional view of a structure having an array of two-way shape memory alloy actuators and input sensors is illustrated, according to one example. As shown, the structure 500 may include a bottom surface 502 and a top surface 504 separated by one or more individually addressable actuators 506 and one or more input sensors 508. The bottom surface 502 may include a rigid material having a bottom inner portion 502a and a bottom outer portion 502b and the top surface 504 may be include a flexible membrane having a top inner portion 504a and a top outer portion 504b.

By way of example and without limitation, each of the individually addressable actuators may be a two-way shape memory alloy material adapted to deform in accordance with an electric current (or voltage) corresponding to an input signal and return to a pre-deformed shape in accordance with turning off the electric current (or voltage), as described above. In accordance with some aspects of the present disclosure, the two-way shape memory alloy material may have the form of springs that may be pre-trained, pre-configured or shaped in an un-actuated position in any manner sufficient to achieve a desired action.

For example, the actuators 506 may be pre-trained in a first un-actuated (e.g., compressive) configuration 506a, or a second un-actuated (e.g., tensile) configuration 506b. The application of an electric current (or voltage) may cause the springs to actuate (e.g., compress or expand) to memorized shapes resulting in the localized deformation (negative or positive) of the thin polymer layer of the top surface 504 where the spring is in contact with the top surface 504.

If an individually addressable spring 506a is pre-configured in the first un-actuated position, application of a voltage to the individually addressable spring may cause the individually addressable spring to actuate or expand causing a localized positive deformation in the flexible membrane. Removal of the voltage may cause the individually addressable spring to return to the first un-actuated position.

If an individually addressable spring 506b is pre-configured in the second un-actuated position, application of a voltage to the individually addressable spring may cause the individually addressable spring to actuate or compress (or contract) causing a localized a negative deformation in the flexible membrane. Removal of the voltage may cause the individually addressable spring to return to the second un-actuated position.

According to one example, the springs may be shaped or pre-configured in a first or second un-actuated position so that upon the application of an electric current (or voltage) to the springs, the springs will expand, causing, encouraging, or allowing a localized area or portion of the flexible membrane to expand (from a first un-actuated position) or contract, causing, encouraging, or allowing a localized area or portion of the flexible membrane to expand (from a second un-actuated position). As shown in FIG. 5B, a voltage 516 may be applied to the structure 500 causing an electric current to be applied to un-actuated springs 506a (in a first un-actuated position) resulting in the springs 506a actuating (See FIG. 5A) to an actuated position (See FIG. 5B) causing the localized area or portion of the top surface flexible membrane 504 in contact with the springs 506a to expand outwardly. In yet another example, as shown in FIG. 5C, the voltage 516 may be applied to the structure causing an electric current to be applied to springs 506b pre-trained (or pre-configured) in a second un-actuated position (See FIG. 5A) resulting in the actuation of the springs 506b (See FIG. 5C) causing the localized area or portion of the top surface flexible membrane 504 in contact with the springs 506b to contract inwardly.

Alternatively, the two-way shape memory alloy material may be wires that may be pre-trained or shaped in any manner sufficient to achieve a desired action. For example, the wires may be pre-trained in a curved, S-shaped, or straight configuration; or the actuators may take another form such as that of a tube, a sheet, etc. The application of an electric current may cause the actuators to contract, expand, compress, stretch, or otherwise deform in any suitable fashion to a memorized (or trained or pre-configured) shape resulting in the localized deformation (e.g., negative or positive) of the membrane of the top surface where the actuator is in contact with the top surface.

Similar to FIG. 4A, each of the input sensors 508a, 508b may include a material 510a, 510b located between a lower sensor 512a, 512b on the bottom inner portion 502a of the bottom surface 502 and an upper sensor 514a, 514b on the top inner portion 504a of the top surface 504. The material 510a, 510b may be a capacitive, dielectric or resistive material such that depressing, compressing or squeezing the input sensors 508a, 508b results in the generation of an input signal.

Exemplary Interactive Mobile Device and Operations Therein

Figure 6:
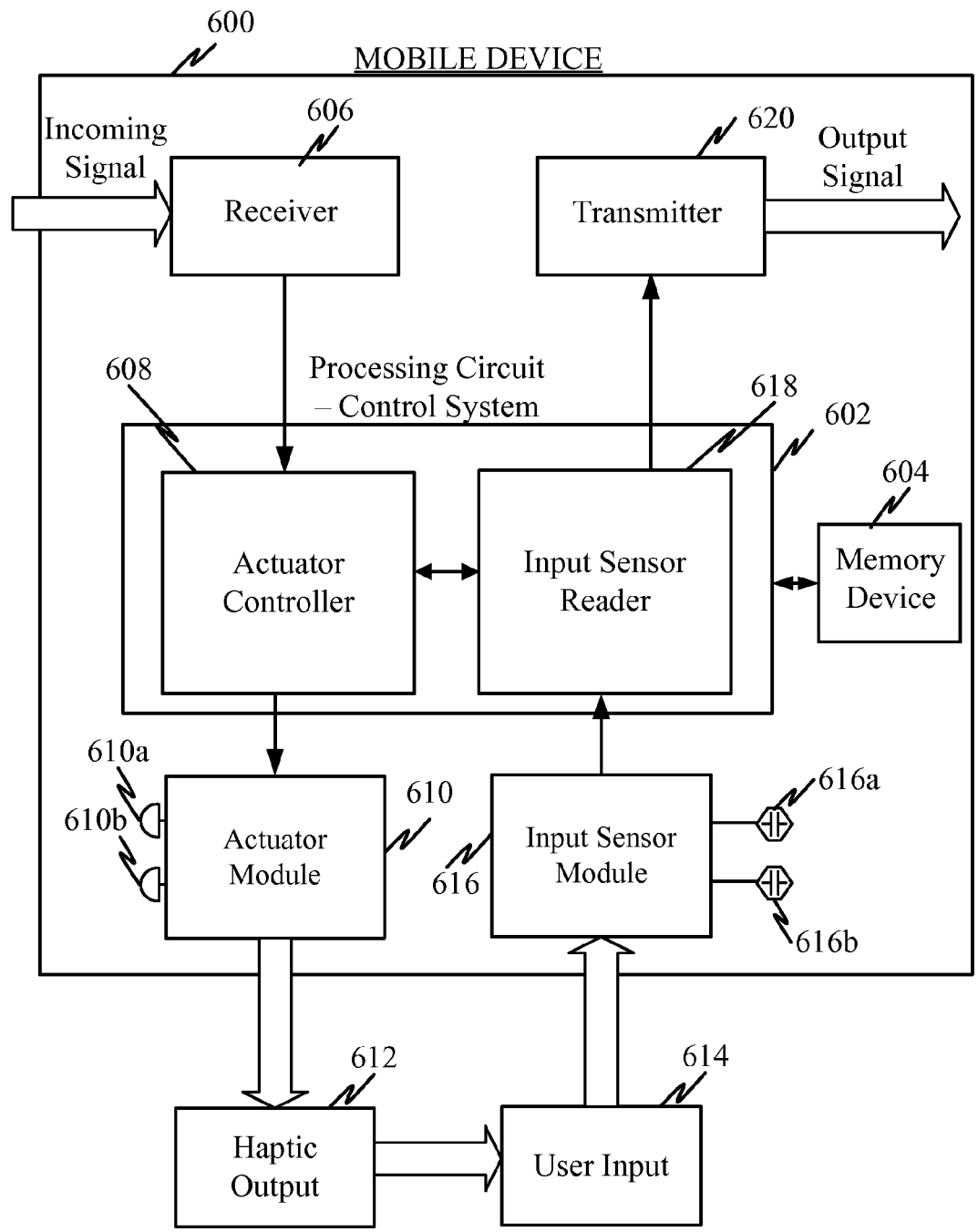
FIG. 6 illustrates a block diagram of an internal structure of an interactive mobile device according to one example.

FIG. 6 illustrates a block diagram of an internal structure of an interactive mobile device 600 according to one example. The mobile device 600 may include a processing circuit (e.g., processor, processing module, etc.)/control system 602 for executing computer-executable process steps and a memory/storage device 604. The memory/storage device 604 may include operations (instructions) for storing received input (or incoming) signals and/or feedback signals from input sensors.

The mobile device 600 may also include a receiver 606 for receiving an incoming signal. The incoming signal received by the receiver 606 may be audible, such as a ringtone, or notification tone, visual, such as a screen change, alarm or notification light, or textual, such as an incoming text message or instant message. The incoming signal may also indicate that an electrical representation of a haptic input has been received on a haptic communication channel. Once received, the incoming signal may be converted to an electrical signal and passed to an actuator controller 608, which may be implemented within the processing circuit/control system 602. The actuator controller 608 may be coupled to an actuator module 610 which may include, or may be coupled to, one or more actuators 610a and 610b that provide a haptic output 612. As described above, the one or more actuators 610a and 610b may cause a localized deformation (negative or positive) in a flexible membrane covering the actuators.

Independently or based on the haptic output 612, user input 614 may be provided to an input sensor module 616 which may include, or may be coupled to, one or more input sensors 616a, 616b. The user input 614 may be generated by the user pressing or squeezing an input sensor, as described above, generating a feedback signal.

An input sensor reader 618, which may be implemented within the processing circuit/control system 602, may receive/read the output from the input sensor module 616. From the output, a feedback signal may be generated by the input sensor reader 618 and sent to a transmitter 620 for transmitting an outgoing signal in the form an audible, visual, textual signal. Additionally, the feedback signal generated by the input sensor reader may send an electrical representation of a haptic input on a haptic communication channel. The electrical representation of the haptic input may be a discreet localized signal, such as a single or multiple poke(s) or a continuous shape change such as a texture change or change in the shape of the device as a whole. These signals may be customized by the user to mean different things (a customized poke, heartbeat, rough or smooth texture, etc.).

Optionally, the input sensor reader 618 may optionally send the feedback signal to the actuator controller 608 for additional or updated actuation information.

Figure 7A:
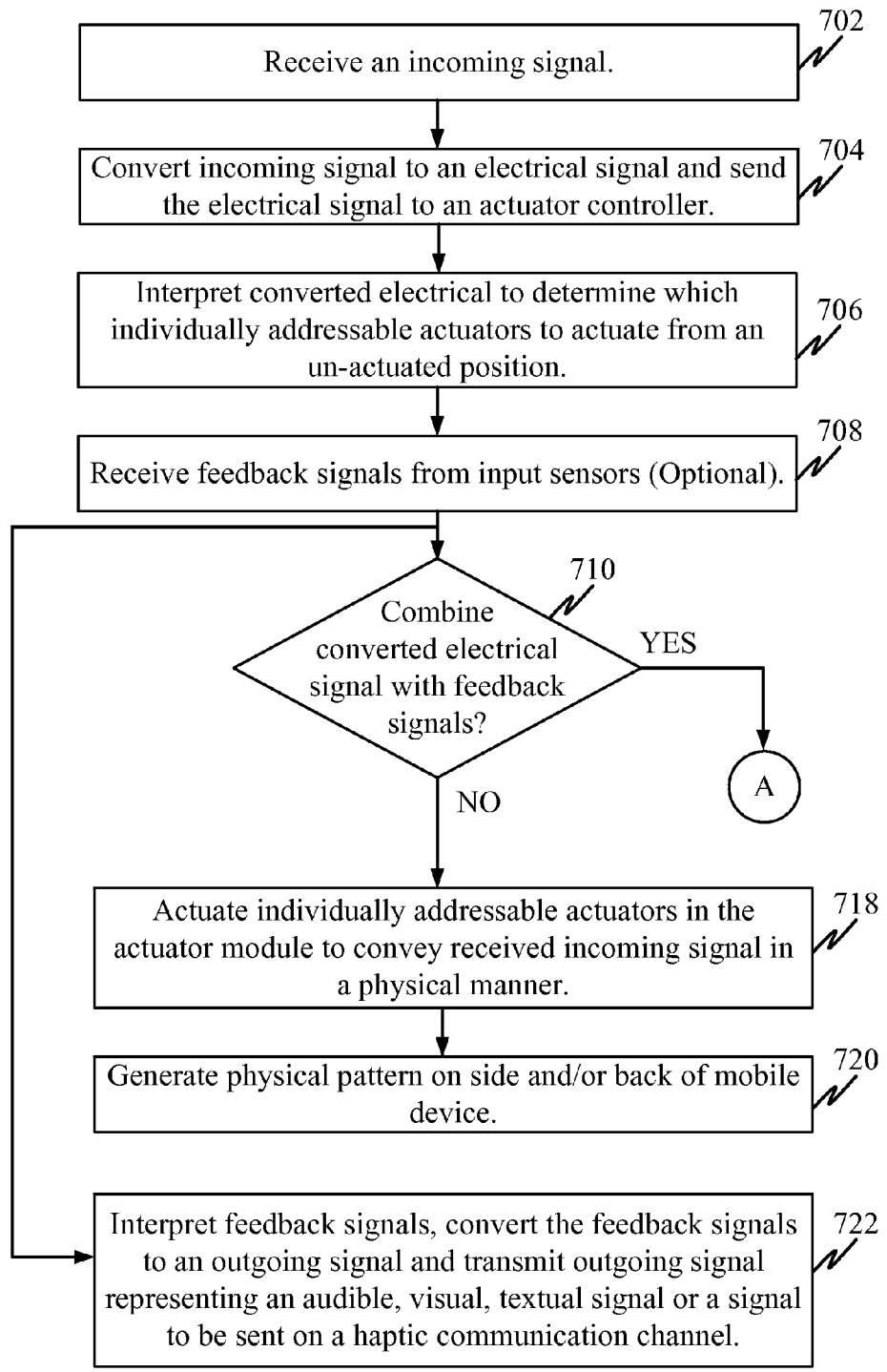
FIG. 7 (including FIGS. 7A and 7B) illustrates a flow diagram of a method, operational on an interactive mobile device, for selectively controlling and varying surface texture of the mobile device using an array of individually addressable actuators.
Figure 7B:
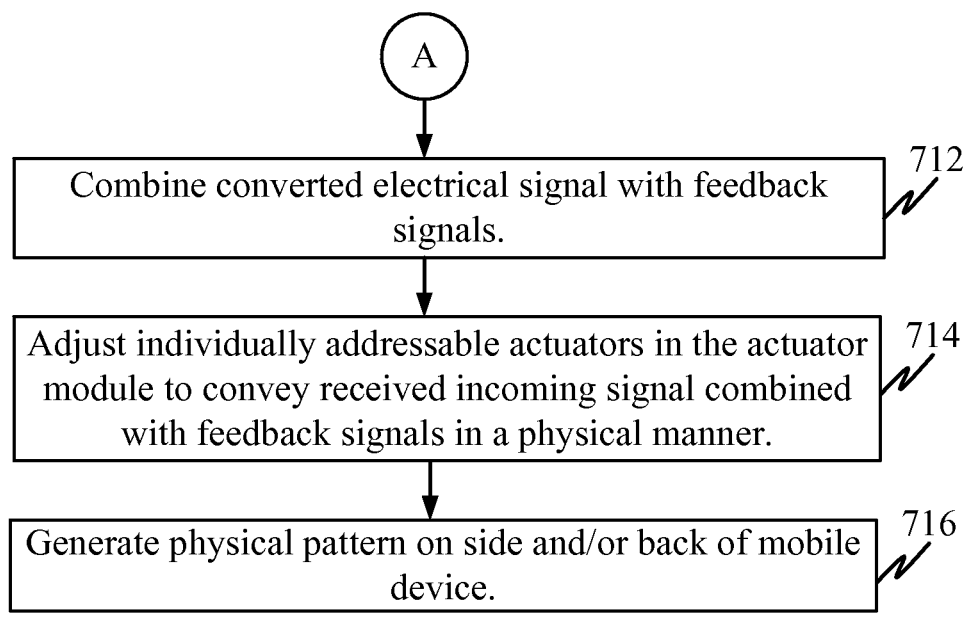

FIG. 7 (including FIGS. 7A and 7B) illustrates a flow diagram of a method, which may be operational on an interactive mobile device, for selectively controlling and varying a surface texture of the mobile device using an array of individually addressable actuators. Here, an array of individually addressable actuators may be embedded on the side and/or back of the interactive mobile device.

First, an incoming signal may be received via a receiver on the mobile device 702. The incoming signal may be audible, such as a ringtone, or notification tone; visual, such as a screen change, alarm or notification light; or textual, such as an incoming text message or instant message. The incoming signal may also indicate a received signal on a haptic communication channel that may contain an electrical representation of a haptic input. Such a signal may be generated by a user squeezing, shaking or stroking the mobile device. Once received, the incoming signal may then be converted to an electrical signal and sent to an actuator controller 704. The actuator controller may interpret the converted signal to determine which if any of the individually addressable actuators to actuate from an un-actuated position 706. Optionally, the actuator controller may receive sensor feedback signals from input sensors 708. For example, some of the input signal may be fed back into the actuator controller to cause further actuation of the actuators. For example, when the device is squeezed, it may result in further actuation to "push back" against the squeeze.

Next, the actuator module may determine if the converted electrical signal should be combined with the feedback signals (i.e. signals from the input sensor) 710. If the actuator module determines that the feedback signal should be combined, the converted electrical signal may then be combined with the feedback signals 712. The combined signal may then be transmitted to the actuator module activating or adjusting the previously activated one or more of the individually addressable actuators in the actuator module to convey the received incoming signal combined with the feedback signal in a physical manner 714. That is, based on which, if any, actuators may be expanded causing a localized positive deformation on the side and/or back surface of the mobile device or contracted causing a localized negative deformation on the side and/or back surface of the mobile device, a physical pattern may be generated 716. The user may then be able to use a hand to feel and determine what the physical pattern is and thus determine what the incoming signal was without having to look at the mobile device.

Alternatively, if the actuator module determines that the signal should not be combined with the input sensor signals, the uncombined converted signal may be sent to the actuator module activating the individually addressable actuators in the actuator module to convey the received incoming signal in a physical manner 718. That is, based on which, if any, actuators may be expanded causing a localized positive deformation on the side and/or back surface of the mobile device or contracted causing a localized negative deformation on the side and/or back surface of the mobile device, a physical pattern may be generated 720. The received incoming signal can be interpreted in physical manner by the hands or other parts of a user's body. The electrical representation of the haptic input may be a discreet localized signal, such as a single or multiple poke(s) or a continuous shape change such as a texture change or change in the shape of the device as a whole. These signals may be customized by the user to mean different things (a customized poke, heartbeat, rough or smooth texture, etc.).

As described above, the interactive mobile device may include an input sensor module that contains capacitive or resistive elements to convey one or more feedback signals from the user back into the device, i.e. receive feedback signals from input sensors 708. This could be an input such as a squeeze, poke or stroke. The feedback signals from the input sensors may be read by the input sensor reader and interpreted, converted to an outgoing signal and transmitted as the output signal to a transmitter in the form of an audible, visual, textual signal or a signal to be sent on a haptic communication channel 722.

Actuator Cooling

As discussed above, two-way memory shape alloy material can remember two different shapes, one at a high temperature and one at a low temperature. The two different shapes may be achieved by heating and cooling the material, respectively. The material may be heated by adding a voltage or electric current to the material and the material may be cooled by removing the voltage or electric current. However, merely removing the voltage or electric current may not cool the material to its low temperature in a sufficient time. As such, an additional method of cooling the material may be used. For example, additional methods of cooling the material may include using water or other suitable cooling fluid by integrating a cooling pump system and responding cooling channel structure within the device; or air by using a fan to integrate the material. Also, when the material used is a spring, metal wings may be adhered to the spring for increasing the heat conduction area; or a porous material like ceramics or structures with pores or drill pores may be placed around the spring to conduct the heat to the air.

Figure 8:
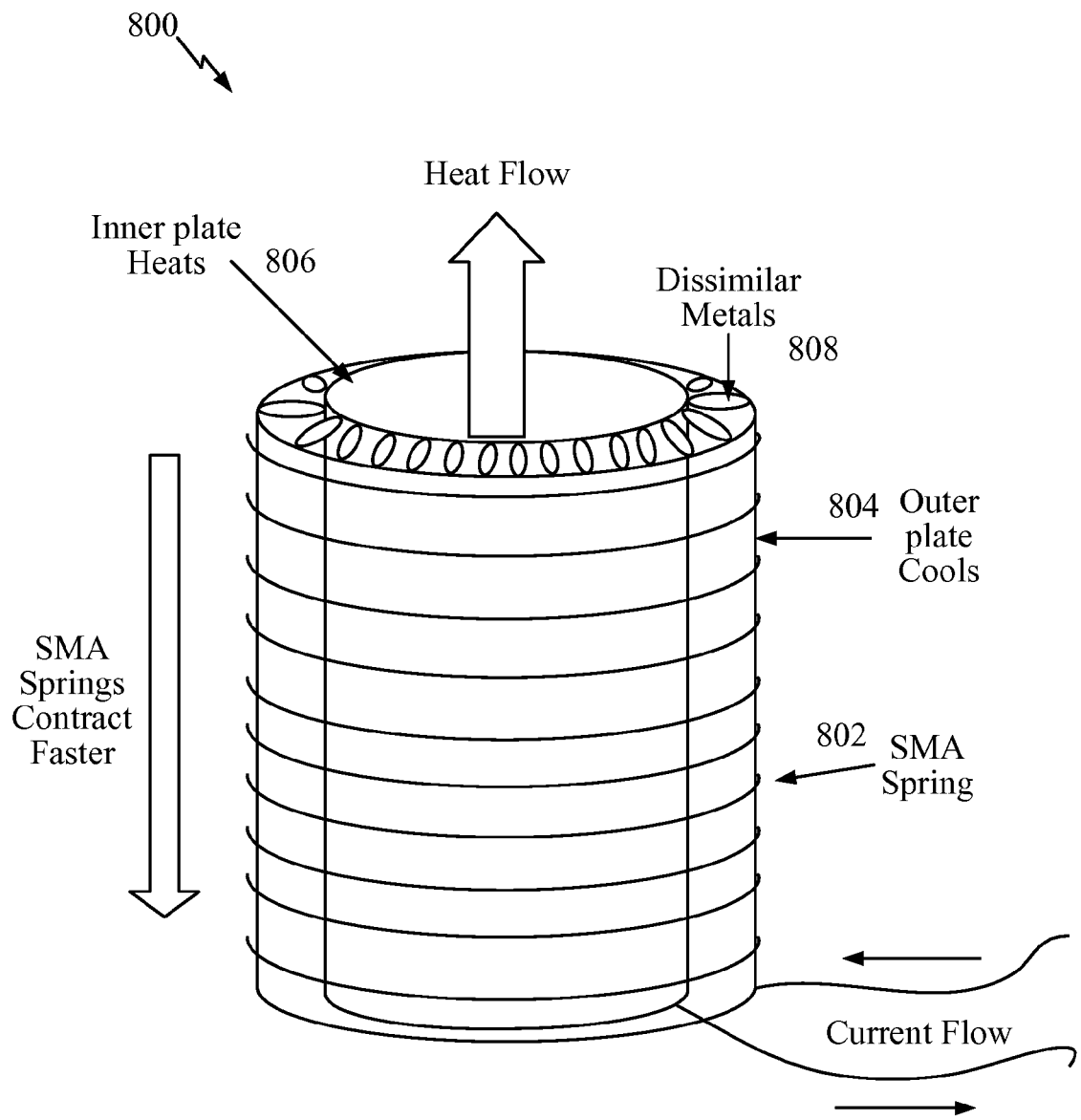
FIG. 8 is a schematic diagram illustrating a thermoelectric cylinder for cooling an actuator, according to one example.

FIG. 8 illustrates a thermoelectric cylinder 800 for cooling an actuator, according to one example. As shown, an actuator may be in the form of a shape memory alloy spring 802 surrounding an outer plate 804 and an inner plate 806 separated by a dissimilar metal 808. That is, the outer and inner plates 804 and 806 may be made of a first material and separated by a second material which is different than the first material. When a current 810 flows through the outer and inner plates 804, 806, a heat flux may be created between the junction of two different types of materials and heat is moved from one side to the other. That is, the heat may be moved or transferred from the outer plate 804 to the inner plate 806 causing the heat to flow away from the spring 802 which in turn causes the springs to contract. Thus, using the Peltier-effect, the thermoelectric cylinder may be used to cool the actuator.

In one configuration, the interactive mobile device 600 for selectively controlling and varying surface texture of the mobile device using an array of individually addressable actuators includes means for receiving an incoming signal; means for actuating one or more individually addressable actuators in an array of individually addressable actuators to cause the localized deformation of a flexible membrane generating a first physical pattern; means for receiving one or more feedback signals from one or more input sensors by touching or deforming the flexible membrane and means for combining the one or more feedback signals with the incoming signal; and means for adjusting the one or more individually addressable actuators in the array of individually addressable actuators based on the one or more feedback signals generating a second physical pattern, the second physical pattern different than the first physical pattern. In one aspect, the aforementioned means may be the processor(s) 602 configured to perform the functions recited by the aforementioned means. In another aspect, the aforementioned means may be a module or any apparatus configured to perform the functions recited by the aforementioned means.

Moreover, in one aspect of the disclosure, the processing circuit 602 illustrated in FIG. 6 may be a specialized processor (e.g., an application specific integrated circuit (ASIC)) that is specifically designed and/or hard-wired to perform the algorithms, methods, and/or steps described in FIGS. 7A and 7B. Thus, such a specialized processor (ASIC) may be one example of a means for executing the algorithms, methods, and/or steps described in FIGS. 7A and 7B. The memory circuit 604 may also store processor 602 readable instructions that when executed by a specialized processor (e.g., ASIC) of processor 602 causes the specialized processor to perform the algorithms, methods, and/or steps described in FIGS. 7A and 7B.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the disclosure. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

The invention claimed is:

1. A haptic interface for varying surface texture, comprising:
   a top surface comprising a flexible membrane;
   a bottom surface, parallel to and opposite the top surface;
   an array of individually addressable actuators disposed between the top surface and the bottom surface;
   a plurality of input sensors located between the top surface and the bottom surface for receiving input information in accordance with a touch of the flexible membrane, wherein the touch of the flexible membrane is adapted to cause at least one of the plurality of input sensors to compress and generate a feedback signal;
   wherein each individually addressable actuator in the array of individually addressable actuators is configured to cause a localized deformation of the top surface into a configurable shape based on an incoming signal.

2. The haptic interface of claim 1, wherein the feedback signal and the incoming signal are combined to actuate one or more of the individually addressable actuators in the array of individually addressable actuators to generate a physical pattern on the top surface.

3. The haptic interface of claim 1, wherein the incoming signal is at least one of an audible signal, a visual signal or textual signal.

4. The haptic interface of claim 1, wherein each of the individually addressable actuators in the array of individually addressable actuators comprises a two-way shape memory alloy (SMA) material adapted to deform in accordance with an electric current corresponding to the incoming signal, and to return to a pre-deformed shape in accordance with a turning off of the electric current.

5. The haptic interface of claim 4, wherein each of the individually addressable actuators is in the form of at least one of a wire, a tube or a sheet.

6. The haptic interface of claim 5, wherein a first individually addressable actuator is pre-configured in a compressive configuration and a second individually addressable actuator is pre-configured in a tensile configuration.

7. The haptic interface of claim 6, wherein application of a voltage to the first individually addressable actuator causes the first individually addressable actuator to actuate from the compressive configuration to an expanded configuration causing a localized positive deformation in the flexible membrane.

8. The haptic interface of claim 6, wherein application of a voltage to the second individually addressable actuator causes the second individually addressable actuator to actuate from the tensile configuration to a contracted configuration causing a localized negative deformation in the flexible membrane.

9. The haptic interface of claim 4, wherein each of the individually addressable actuators is in the form of at least one of a wire, a tube, a sheet, or a spring.

10. The haptic interface of claim 9, wherein at least one actuator among the individually addressable actuators is pre-configured in a first un-actuated position such that an application of a voltage to the at least one individually addressable actuator causes the at least one individually addressable actuator to expand to a first actuated position causing a localized positive deformation in the flexible membrane.

11. The haptic interface of claim 10, wherein removal of the voltage to the individually addressable spring causes the at least one individually addressable actuator to return to the first un-actuated position.

12. The haptic interface of claim 9, wherein at least one actuator among the individually addressable actuators is pre-configured in a second un-actuated position such that an application of a voltage to the at least one individually addressable actuator causes the at least one individually addressable actuator to compress to a second actuated position causing a localized negative deformation in the flexible membrane.

13. The haptic interface of claim 12, wherein removal of the voltage to the individually addressable spring causes the at least one individually addressable actuator to return to the second un-actuated position.

14. The haptic interface of claim 1, wherein one or more individually addressable actuators in the array of individually addressable actuators is combined in a group causing the one or more individually addressable actuators in the group to actuate in unison.

15. The haptic interface of claim 1, wherein one or more individually addressable actuators in the array of individually addressable actuators surround a thermoelectric cylinder for cooling the one or more individually addressable actuators.

16. The haptic interface of claim 1, wherein each sensor in the plurality of sensors includes a material located between a lower sensor on the bottom surface and an upper sensor located on the top surface.

17. An interactive mobile device, comprising:
a haptic interface, comprising:
a top surface comprising a flexible membrane;
a bottom surface parallel to and opposite the top surface;
an array of individually addressable actuators disposed between the top surface and the bottom surface, wherein each individually addressable actuator in the array of individually addressable actuators is configured to cause a localized deformation of the top surface into a configurable shape based on an incoming signal; and
a plurality of input sensors located between the top surface and the bottom surface for receiving input information in accordance with a touch of the flexible membrane;
a memory device; and
at least one processor coupled to the haptic interface and the memory device, the at least one processor configured to:
receive the incoming signal;
actuate one or more individually addressable actuators in the array of individually addressable actuators to cause the localized deformation of the flexible membrane generating a physical pattern; and
receive at least one feedback signal from the plurality of input sensors in accordance with a touching or deforming of the flexible membrane compressing one or more of the plurality of input sensors.

18. The interactive mobile device of claim 17, wherein the at least one processor is further configured to:
combine the at least one feedback signal with the incoming signal; and
adjust the one or more individually addressable actuators in the array of individually addressable actuators based on the at least one feedback, generating a different physical pattern.

19. The interactive mobile device of claim 17, wherein the at least one processor is further configured to:
interpret the at least one feedback signal;
convert the at least one feedback signal to an outgoing signal; and
transmit the outgoing signal in the form of an audible, visual or textual signal.

20. The interactive mobile device of claim 17, wherein the incoming signal comprises at least one of an audible signal, a visual signal or textual signal.

21. The interactive mobile device of claim 17, wherein each of the individually addressable actuators in the array of individually addressable actuators comprises a two-way shape memory alloy (SMA) material adapted to deform in accordance with an electric current corresponding to the incoming signal, and to return to a pre-deformed shape in accordance with a turning off of the electric current.

22. The interactive mobile device of claim 21, wherein each of the individually addressable actuators is in the form of at least one of a wire, a tube, a sheet, or a spring.

23. The interactive mobile device of claim 22, wherein at least one of the individually addressable actuators is pre-configured in a first un-actuated position, such that an application of a voltage to the at least one individually addressable actuator causes the at least one individually addressable actuator to expand to a first actuated position causing a localized positive deformation in the flexible membrane.

24. The interactive mobile device of claim 23, wherein removal of the voltage to the at least one individually addressable actuator causes the at least one individually addressable actuator to return to the first un-actuated position.

25. The interactive mobile device of claim 22, wherein at least one of the individually addressable actuators is pre-configured in a second un-actuated position, such that an application of a voltage to the at least one individually addressable actuator causes the at least one individually addressable actuator to compress to a second actuated position causing a localized negative deformation in the flexible membrane.

26. The interactive mobile device of claim 25, wherein removal of the voltage to the at least one individually addressable actuator causes the at least one individually addressable actuator to return to the second un-actuated position.

27. A method operational on an interactive device, comprising:
receiving an incoming signal;
actuating one or more individually addressable actuators in an array of individually addressable actuators to cause a localized deformation of a flexible membrane, generating a first physical pattern; and
receiving one or more feedback signals from one or more input sensors with a touching or deforming of the flexible membrane compressing the one or more input sensors.

28. The method of claim 27, further comprising:
combining the one or more feedback signals with the incoming signal; and
adjusting the one or more individually addressable actuators in the array of individually addressable actuators based on the one or more feedback signals to generate a second physical pattern, the second physical pattern different than the first physical pattern.

29. The method of claim 28, further comprising:
interpreting the one or more feedback signals;
converting the one or more feedback signals to an outgoing signal; and
transmitting the outgoing signal in the form of an audible, visual or textual signal.

30. The method of claim 27, wherein the incoming signal is at least one of an audible signal, a visual signal or textual signal.

31. The method of claim 27, wherein each of the individually addressable actuators in the array of individually addressable actuators comprises a two-way shape memory alloy (SMA) material adapted to deform in accordance with an electric current corresponding to the incoming signal, and to return to a pre-deformed shape in accordance with a turning off of the electric current.

32. The method of claim 31, wherein at least one of the individually addressable actuators is in the form of at least one of a wire, a tube, a sheet, or a spring.

33. The method of claim 32, wherein at least one of the individually addressable actuators is pre-configured in a first un-actuated position, such that an application of a voltage to the at least one individually addressable actuator causes the at least one individually addressable actuator to expand to a first actuated position causing a localized positive deformation in the flexible membrane.

34. The method of claim 33, wherein removal of the voltage to the at least one individually addressable actuator causes the at least one individually addressable actuator to return to the first un-actuated position.

35. The method of claim 32, wherein at least one of the individually addressable actuators is pre-configured in a second un-actuated position, such that an application of a voltage to the at least one individually addressable actuator causes the at least one individually addressable actuator to compress to a second actuated position causing a localized negative deformation in the flexible membrane.

36. The method of claim 35, wherein removal of the voltage to the individually addressable spring causes the at least one individually addressable actuator to return to the second un-actuated position.

37. An interactive mobile device, comprising:
means for receiving an incoming signal;
means for actuating one or more individually addressable actuators in an array of individually addressable actuators to cause a localized deformation of a flexible membrane generating a first physical pattern, the array of individually addressable actuators disposed between a top surface having the flexible membrane, and a bottom surface of a haptic interface of the mobile device, and wherein each individually addressable actuator in the array of individually addressable actuators is configured to cause a localized deformation of the top surface into a configurable shape based on the incoming signal; and
means for receiving one or more feedback signals from one or more input sensors with a touching or deforming of the flexible membrane compressing the one or more input sensors, the one or more input sensors located between the top surface and the bottom surface of the haptic interface for receiving input information in accordance with a touch of the flexible membrane.

38. The interactive mobile device of claim 37, further comprising:
means for combining the one or more feedback signals with the incoming signal; and
means for adjusting the one or more individually addressable actuators in the array of individually addressable actuators based on the one or more feedback signals generating a second physical pattern, the second physical pattern different than the first physical pattern.

39. The interactive mobile device of claim 37, further comprising:
means for interpreting the one or more feedback signals;
means for converting the one or more feedback signals to an outgoing signal; and
means for transmitting the outgoing signal in the form of an audible, visual or textual signal.

40. The interactive mobile device of claim 37, wherein each of the individually addressable actuators in the array of individually addressable actuators comprise a two-way shape memory alloy (SMA) material adapted to deform in accordance with an electric current corresponding to the incoming signal, and to return to a pre-deformed shape in accordance with a turning off of the electric current.

41. The interactive mobile device of claim 40, wherein each of the individually addressable actuators is in the form of at least one of a wire, a tube, a sheet, or a spring.

42. The interactive mobile device of claim 40, wherein at least one of the individually addressable actuators is pre-configured in a first un-actuated position, such that an application of a voltage to the at least one individually addressable actuator causes the at least one individually addressable actuator to expand to a first actuated position causing a localized positive deformation in the flexible membrane.

43. The interactive mobile device of claim 42, wherein removal of the voltage to the at least one individually addressable actuator causes the at least one individually addressable actuator to return to the first un-actuated position.

44. The interactive mobile device of claim 40, wherein at least one of the individually addressable actuators is pre-configured in a second un-actuated position, such that an application of a voltage to the at least one individually addressable actuator causes the at least one individually addressable actuator to compress to a second actuated position causing a localized negative deformation in the flexible membrane.

45. The interactive mobile device of claim 44, wherein removal of the voltage to the at least one individually addressable actuator causes the at least one individually addressable actuator to return to the second un-actuated position.

* * * * *